UNITED STATES PATENT OFFICE.

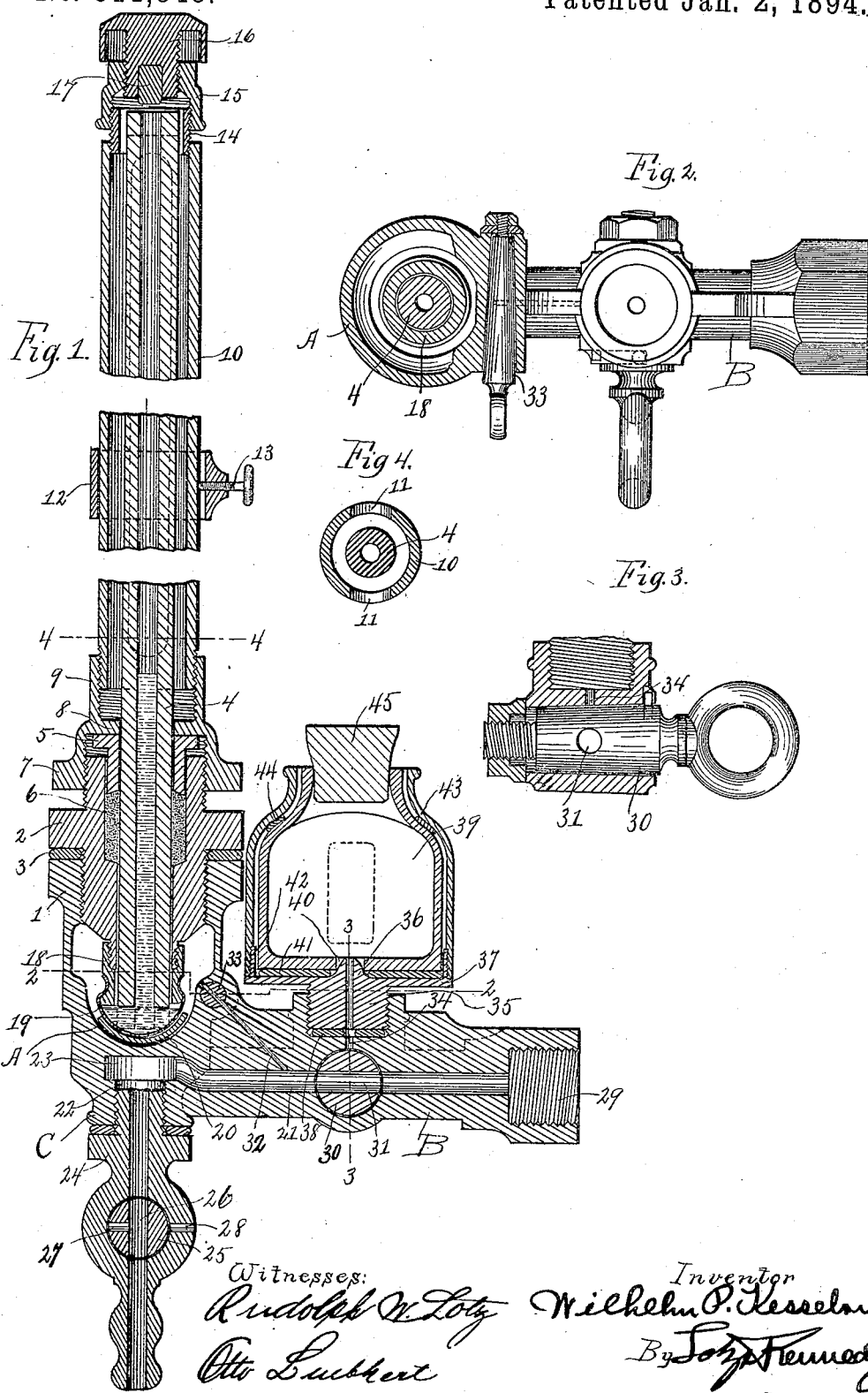

WILHELM PETER KESSELRING, OF CHICAGO, ILLINOIS, ASSIGNOR OF ONE-HALF TO HENRY P. BEILER, OF SAME PLACE.

APPARATUS FOR TESTING GAS-PIPES.

SPECIFICATION forming part of Letters Patent No. 511,848, dated January 2, 1894.

Application filed September 6, 1892. Serial No. 445,205. (No model.)

*To all whom it may concern:*

Be it known that I, WILHELM PETER KESSELRING, a citizen of the United States, residing at Chicago, in the county of Cook and State of Illinois, have invented certain new and useful Improvements in Apparatus for Testing Gas-Pipes; and I do hereby declare the following to be a full, clear, and exact description of the invention, such as will enable others skilled in the art to which it appertains to make and use the same.

This invention relates to a novel construction in an apparatus or device for testing pipes, and intended more particularly for testing the gas pipes in a house or other structure, so as to determine whether the joints are all tight or whether there is any leak in the system of pipes.

The invention consists in the features of construction and the combinations of parts hereinafter fully described and specifically claimed.

In the accompanying drawings illustrating my invention,—Figure 1 is a vertical sectional view of the same. Fig. 2 is a section on the line 2—2 of Fig. 1. Fig. 3 is a sectional view on the line 3—3 of Fig. 1, and Fig. 4 is a sectional view on the line 4—4 of Fig. 1.

Referring now to said drawings, A indicates a cup provided with an uprising, interiorly screw-threaded flange 1 within which is located a packing gland 2 having a rubber washer therein to form a tight joint between said packing gland and said flange. Passing through said stuffing box 2 is a glass tube 4 having its lower end located within the cup A, while its upper end passes above said stuffing box. A packing gland 5 is located around said tube 4 and serves to compress the packing 6 around the tube by means of a nut 7 having an interiorly screw-threaded lower end that engages the upper screw-threaded end of the stuffing box 2 and an interior flange 8 that engages the upper end of the packing gland 5. In this way it will be seen, that by securing the nut 7 down upon the packing gland a tight joint will be made between the tube and the stuffing box. The upper end 9 of the nut 7 is screw threaded and receives the screw-threaded lower end of a metallic tube 10 that surrounds the glass tube 4 and serves to protect the same, said metallic protecting tube 10 having slots 11 therein, so as to expose said glass tube 4. A gage 12 surrounds the protecting tube 10 and is adapted to be held thereon, at any desired location, by a set screw 13 that passes through the gage 12 and engages the said protecting tube 10.

The upper end of the glass tube 4 is open and I have provided means whereby said upper end can be closed or opened as desired, which are constructed as follows: Connected with the upper end of the protecting tube 10, by means of a coupling 14, is a sleeve 15 interiorly screw-threaded at its upper end to receive a nut or cap 16 that is provided at its lower end with a stopper 17 that is adapted to engage the upper end of the glass tube 4 and close the same. It will be noted that when the cap 16 is raised so as to move the stopper away from the upper end of the tube 4, such tube can communicate with the outer air through the protecting tube 10 and slots 11 therein. As before described, the lower end of the tube 4 projects into the cup A. Secured to the lower end of the stuffing box 2, which also projects into said cup A, is a coupling 18 that extends down into the cup and is provided with a flexible diaphragm 19 that is tightly secured to the lower end of the coupling 18 and extends down into the cup and around the lower end of the tube 4. The said flexible diaphragm 19 can be made of various substances, but I have found it convenient to employ a soft and flexible skin, such as a piece of bladder, which not only will hold the quicksilver or mercury that is placed therein, but will also give the desired flexibility to said diaphragm, and to prevent the same from hardening, so that it will always be flexible, I place within the bottom of the cup a piece of oiled cloth 20, against which said diaphragm rests when in its normal position, and will be kept flexible and soft by the action of the oil thereon. Within the tube is located a quantity of mercury or quicksilver which fills the chamber or receptacle made by the flexible diaphragm, and also fills a portion of the tube, as shown in said Fig. 1.

At the lower end of the device, and forming part of the frame thereof, are two branches B and C. Each of said branches is provided with a passage therethrough, indicated by 21 and 22 respectively, which communicate with a common chamber 23. The said branch C is provided with a nozzle 24 which can be connected by means of a suitable hose or pipe with an air pump. A valve 25 is interposed within the nozzle 24 and is provided with a straight passage therethrough and a right angular passage 27 communicating with said straight passage 26. The said nozzle is also provided with a lateral passage 28 adapted to communicate with said valve passage 27. The branch B is provided with a screw-threaded end or tap 29, by which it can be connected with the end of a gas pipe in an obvious manner. Located within the branch B is a valve 30 having a straight passage 31 therethrough. The said passage 31 in the branch B communicates at a point inward of the valve 30 with the cup A, by means of a small passage 32 which is controlled by a valve 33.

Formed over the valve 30, and communicating therein, is a small passage 34 that leads through the wall or side of the branch B. Around the said opening 34 is formed a screw-threaded recess or depression to receive the screw-threaded coupling 35, and is provided at its upper end with a nipple or reduced end 36, and the outwardly projecting flange or disk 37. Between the lower end of the coupling 35 and the recess, within which it is located, is a packing ring or washer 38 to form a tight joint between the same. Resting upon and supported by said disk or flange 37 is a bottle or receptacle 39 that is perforated at its bottom, as at 40, which perforation is adapted to receive the nipple or reduced end 36 of the coupling, and between the bottom of said bottle and said disk 37 is a packing ring or washer 41. The flange or disk 37 is provided near its outer end and surrounding the bottle 39 with an uprising screw-threaded flange 42 adapted to engage the lower screw-threaded end of a metallic case 43 which is approximately the same shape as the bottle 39, and between which case and bottle and near the upper end thereof is located a packing ring or washer 44. In this way it will be seen that the metallic case 43 serves to hold the bottom in place and compress the washers 41 and 44 for obvious reasons. A rubber stopper or cork 45 is placed within the upper end of the bottle 39.

The parts being constructed and arrranged as described, the operation of my invention is as follows: When it is desired to test, for instance, the gas pipes of a house, the end of the branch B is connected with the end of one of the pipes, the valve 30 is opened, the valve 33 is closed, and the valve 25 is opened. The air pipe is then operated to force air into the gas pipes to maintain the requisite pressure therein, and after this is obtained the valve 25 is closed and valve 33 opened, so as to admit the air which is under pressure in the system of pipes to act upon the flexible diaphragm 19 in the cup A. The said pressure of the air acting upon said diaphragm will obviously cause the mercury in the tube 4 to rise to a height corresponding with the pressure of the air, it being noted that the cap 16 is lifted to expose the upper end of the tube 4. The gage 12 is now moved to mark the height at which the mercury stands and is secured in this position. The device is now allowed to remain for some time in this condition, and it will be noted that if there are any leaks in the system of pipes it will obviously allow the escape of air therein, which will reduce the pressure and permit the column of mercury to fall in accordance therewith. The fall of the mercury can, of course, be told by the measure of the gage 12, and if it is found that the pipes are leaking the valve 33 is closed and the following steps are taken to locate said leak: The bottle 39 contains a supply of ether, or other substance, evaporating at a low temperature and having a marked odor, and, of course, this supply will fill the passage through the coupling 35 and passage 34. When it is desired to locate the leak the valve 30 is turned so that the passage 31 therethrough will communicate with the passage 34, and thereupon the valve passage 31 will be filled with ether. The valve 30 is then turned again to the position shown in 31, to allow the ether contained in its passage 31 to enter the pipes. The ether will evaporate rapidly and the gas therefrom will pass to every portion of the pipe and will, of course, mix with the air and escape at any leak or leaks in the pipe, which can be readily detected by smelling along the line of pipes in the usual manner. It will, of course, be noted that the supply of ether can be increased by simply turning the valve 30 so that its passage 31 can be filled again or any number of times. The lateral or right angular passage 27 of the valve 25 serves to permit the escape of air from the pipes at any time when it may not be desired to disconnect the device or the air pipe, and this can be accomplished by giving to said valve 25 a half turn from the position shown in 21, so as to bring said passage 27 in communication with the passage 28 in the nozzle.

When it is desired to transport the device or place it in any except an upright position, the cap 16 can be screwed down so that the stopper 17 will close the upper end of the tube 4 and thus prevent the escape of the mercury.

I claim as my invention—

1. In an apparatus of the kind specified, the combination with the cup A of a tube projecting into the same, a flexible diaphragm closing the lower end of said tube, a fluid located within said tube and the receptacle made by said flexible diaphragm, branches B and C having passages therethrough that communicate with each other and with the interior of said cup.

2. In an apparatus of the kind specified, the combination with a cup A of a tube extending into the same and provided at its end with a flexible diaphragm closing the lower end of said tube, a fluid located within said tube and within the receptacle formed by said diaphragm, branches B and C having passages therethrough communicating with each other and with said cup A, and valves in said branches.

3. In an apparatus of the kind specified the combination with the cup A, of a tube projecting into the same and provided with a flexible diaphragm closing its end, a fluid located within said tube and within the receptacle formed by said diaphragm, and branches B and C having passages communicating with each other and with said cup, and a valve located practically as described to control the communication between said pipes or passages and the cup.

4. In an apparatus of the kind specified the combination with a cup of a tube projecting into the same and provided with a flexible diaphragm for closing its lower end, a fluid located within said tube and a receptacle formed by said diaphragm, branches B and C having pipes or passages communicating with each other and with said cup, a valve in the pipe or passage of said branch C, a valve in pipe or passage of said branch B, and devices practically as described for supplying a volatile fluid to said passage in the branch B.

5. In an apparatus of the kind specified, the combination with a cup A of a tube projecting into the same, and provided with a flexible diaphragm closing its lower end, a fluid located within said tube and the receptacle formed by said diaphragm, branches B and C having passages communicating with each other and with said cup A, a valve for closing the communication between said passages and said cup A, and a movable gage secured upon said tube.

6. In an apparatus of the kind specified a pipe or passage B having a valve chamber, an auxiliary passage 34 independent of the pipe or passage B communicating at one end with said valve chamber, a bottle or receptacle for containing a volatile fluid communicating with the other end of said auxiliary passage 34, a valve located within said valve chamber, and a passage through said valve which is adapted to communicate with said passages B and 34 as the valve is turned, substantially as described.

7. In an apparatus of the kind specified, the combination with a pipe or passage having a passage 34 through the side of the same and communicating with a valve chamber therein, of a bottle or receptacle communicating by means of a perforated coupling 35 with said passage 34, and a valve in said valve chamber having an opening 31 therethrough adapted to communicate respectively with said pipe or passage and the passage 34.

8. In an apparatus of the kind specified, the combination with a cup of a tube projecting into the same and provided with a flexible diaphragm for closing the end of said tube, a fluid located within said tube and the receptacle formed by said flexible diaphragm, branches B and C having pipes or passages therein communicating with each other and with said cup, and a removable cup located adjacent to the outer end of said tube and provided with a stopper for closing the end thereof.

9. In an apparatus of the kind specified, the combination with a cup of a tube projecting into the same and provided with a flexible diaphragm for closing the end of said tube, a fluid located within said tube and the receptacle formed by said diaphragm, branches B and C having passages communicating with each other and with said cup, valves in said passages and in the passage leading therefrom to said cup, a passage 34 leading from the valve chamber in the valve of said branch B, a coupling 35 secured to said branch and having an opening therethrough communicating with said passage 34, a flange or disk 37 upon said coupling 35, a bottle or receptacle 39 having a perforated bottom communicating with the passage in said coupling 35, a case 43 having a screw-threaded connection with said flange or disk 37 and adapted to engage said bottle or receptacle 39, and packing rings or washers between said case or bottle.

10. In an apparatus of the kind specified, the combination with a tube closed at one end by a flexible diaphragm and adapted to contain a fluid, of a cup surrounding said flexible diaphragm, branches B and C communicating with each other and with said cup, and a receptacle for containing a volatile fluid communicating with said branch B.

11. In an apparatus of the kind specified, the combination with a tube closed at one end by a flexible diaphragm and adapted to contain a fluid, of a cup surrounding said flexible diaphragm, a moist pad in said cup located in contact with said diaphragm, and branches B and C communicating with each other and with said cup.

In testimony whereof I affix my signature in presence of two witnesses.

WILHELM PETER KESSELRING.

Witnesses:
RUDOLPH H. LOTZ,
WM. H. LOTZ.